P. H. WIEDERSUM.
Gig Saddle-Tree.

No. 124,303. Patented March 5, 1872.

Witnesses
John A. Ellis
C. Alexander

Inventor
Philip H. Wiedersum,
Per
T. Y. Alexander
Atty.

124,303

UNITED STATES PATENT OFFICE.

PHILIP H. WIEDERSUM, OF NEW YORK, N. Y., ASSIGNOR TO WIEDERSUM MANUFACTURING COMPANY, OF SAME PLACE.

IMPROVEMENT IN GIG-SADDLE TREES.

Specification forming part of Letters Patent No. 124,303, dated March 5, 1872.

SPECIFICATION.

*To all whom it may concern:*

Be it known that I, PHILIP H. WIEDERSUM, of New York, in the county of New York and State of New York, have invented certain new and useful Improvements in Gig-Saddle Trees; and I do hereby declare that the following is a full, clear, and exact description thereof, reference being had to the accompanying drawing and to the letters of reference marked thereon, which form a part of this specification.

The nature of my invention consists in the construction and arrangement of a saddle-tree for harness, and in the mode of fastening the saddle to the same, as will be hereinafter more fully set forth.

In order to enable others skilled in the art to which my invention appertains to make and use the same, I will now proceed to describe its construction and operation, referring to the annexed drawing, in which—

Figure 1:
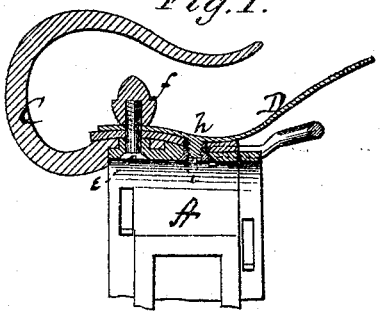
Figure 2:
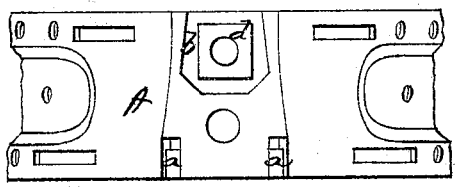
Figure 3:
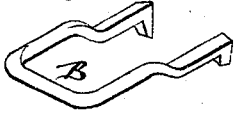

Figure 1 is a cross-section of the entire tree and saddle, and Fig. 2 is a plan view of the tree. Fig. 3 is a perspective of the back-strap loop.

A represents the saddle-tree formed in suitable shape and provided in the center, at the rear edge, with two grooves, $a\ a$, at the inner ends of which are holes through the tree. B is the back-strap loop, the ends of which are turned down as hooks and laid in the grooves $a\ a$, the turned-down portions entering the holes mentioned, and the loop is then fastened or held firmly in position by the saddle, as will be hereinafter set forth. From the front edge backward, in the upper side in the tree A, is a polygonal-shaped recess, $b$, with a square bolt-head, $d$, in the center, said nut having female screw-threads through the entire thickness of the tree. In the recess $b$ is placed the lower end of the check-rein hook C, which is shaped to correspond with said recess, and has a square hole for the insertion of the square bolt-head $d$. From the under side of the tree a screw, $e$, is screwed through the nut $d$ and through the front end of the cantle D and fastened by an ornamental nut, $f$, on top, thus securing the tree, saddle, and check-hook together. As an additional fastening a screw, $h$, projects from the under side of the cantle D into a hole in the tree, and a screw-nut, $i$, is placed from underneath on said screw, the heads of both the screw $e$ and nut $i$ entering countersinks on the under side of the tree so as to present an even surface. A piece of leather, E, is interposed between the tree and cantle, as shown, the screws $e$ and $h$ passing through the same. By means of the saddle D and leather E pressing down upon the arms of the loop B the same is held firmly in its place.

Having thus fully described my invention, what I claim as new, and desire to secure by Letters Patent, is—

The combination of the tree A, having recess $b$ and grooves $a\ a$, with cantle D, screws $e\ h$, nuts $f\ i$, loop B, hook C, and bolt-head $d$, substantially as and for the purpose set forth.

In testimony that I claim the foregoing as my own I affix my signature in presence of two witnesses.

PHILIP H. WIEDERSUM.

Witnesses:
   JNO. A. ELLIS,
   J. V. WHITE.